United States Patent
Ping et al.

(10) Patent No.: US 11,063,510 B2
(45) Date of Patent: Jul. 13, 2021

(54) SWITCHING POWER CONVERTER WITH IMPROVED POWER FACTOR CORRECTION VIA FEEDBACK SIGNAL AVERAGING

(71) Applicant: DIALOG SEMICONDUCTOR INC., Campbell, CA (US)

(72) Inventors: Laiqing Ping, Campbell, CA (US); Xiaoyan Wang, Campbell, CA (US); Nan Shi, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/548,629

(22) Filed: Aug. 22, 2019

(65) Prior Publication Data
US 2021/0057988 A1    Feb. 25, 2021

(51) Int. Cl.
| | |
|---|---|
| *H02M 1/42* | (2007.01) |
| *H02M 7/217* | (2006.01) |
| *H02M 1/00* | (2006.01) |
| *H02M 1/14* | (2006.01) |

(52) U.S. Cl.
CPC .......... *H02M 1/4225* (2013.01); *H02M 7/217* (2013.01); *H02M 1/14* (2013.01); *H02M 1/42* (2013.01); *H02M 2001/0025* (2013.01)

(58) Field of Classification Search
CPC ...... H02M 1/4225; H02M 7/217; H02M 1/14; H02M 1/42; H02M 2001/0025
See application file for complete search history.

(56) References Cited

U.S. PATENT DOCUMENTS

| | | | | |
|---|---|---|---|---|
| 4,859,871 | A * | 8/1989 | Kobayashi | H04N 5/185 327/333 |
| 2004/0150380 | A1 | 8/2004 | Santin et al. | |
| 2008/0238391 | A1* | 10/2008 | Williams | H01F 7/1844 323/283 |
| 2014/0002042 | A1* | 1/2014 | Wismar | H02M 3/157 323/282 |
| 2019/0044435 | A1* | 2/2019 | Kim | H02M 1/4225 |
| 2019/0305679 | A1* | 10/2019 | Jiang | H02M 3/158 |

OTHER PUBLICATIONS

Yu-Tzung et al., "Digital control of boost PFC AC/DC converters with low THD and fast dynamic response", IEEE 6th International Power Electronics and Motion Control Conference, 2009.
Jason Forbes et al., "Improving the dynamic response of power factor correctors using simple digital filters: Moving average filter comparative evaluation", IEEE Energy Conversion Congress and Exposition, 2013.
M. Gong, "Novel Digital Controller for Boost PFC In: Master of thesis Electrical Power Engineering Faculty of EEMCS", Delft University of Technology, Jun. 2015.
M. K. H. Cheung et al., "An analog implementation to improve load transient response of PFC pre-regulators", INTELEC 07—29th International Telecommunications Energy Conference, 2007.

* cited by examiner

*Primary Examiner* — Kyle J Moody
*Assistant Examiner* — Lakaisha Jackson
(74) *Attorney, Agent, or Firm* — Haynes and Boone, LLP

(57) ABSTRACT

The feedback loop of a switching power converter controller is provided with an averaging circuit that averages either an output voltage, an error signal, or a control voltage. Regardless of which feedback signal is averaged, the averaging occurs over a first cycle of a rectified input voltage to form an averaged signal that is used by the feedback loop in a subsequent cycle of the rectified input voltage.

20 Claims, 5 Drawing Sheets

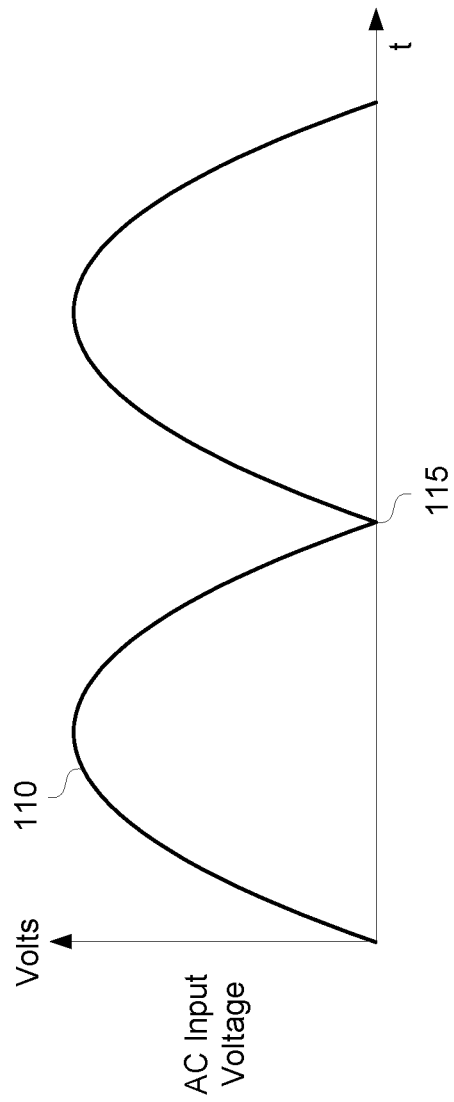
FIG. 1 - Prior Art
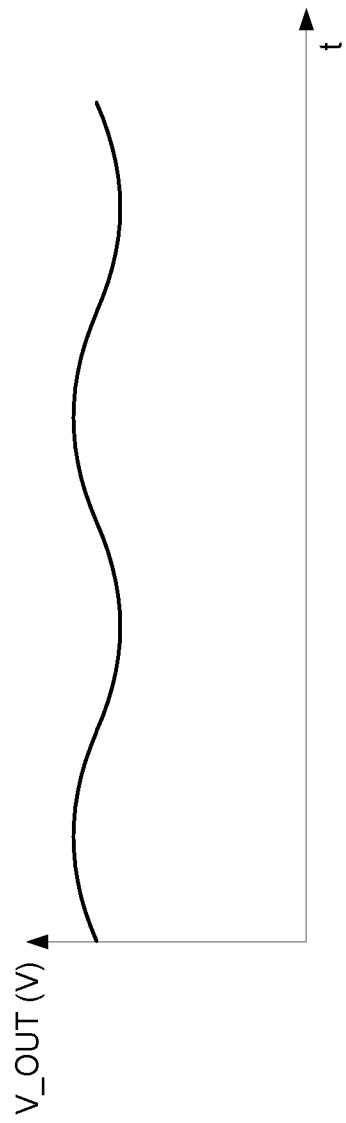
FIG. 2 - Prior Art

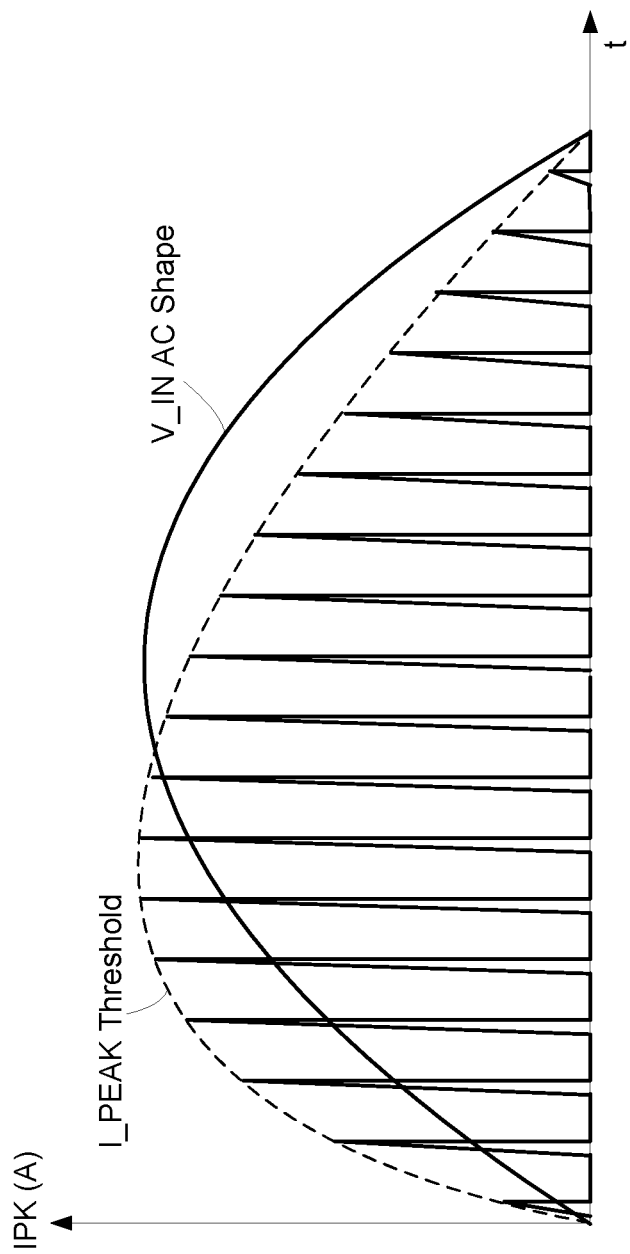
FIG. 3 – Prior Art

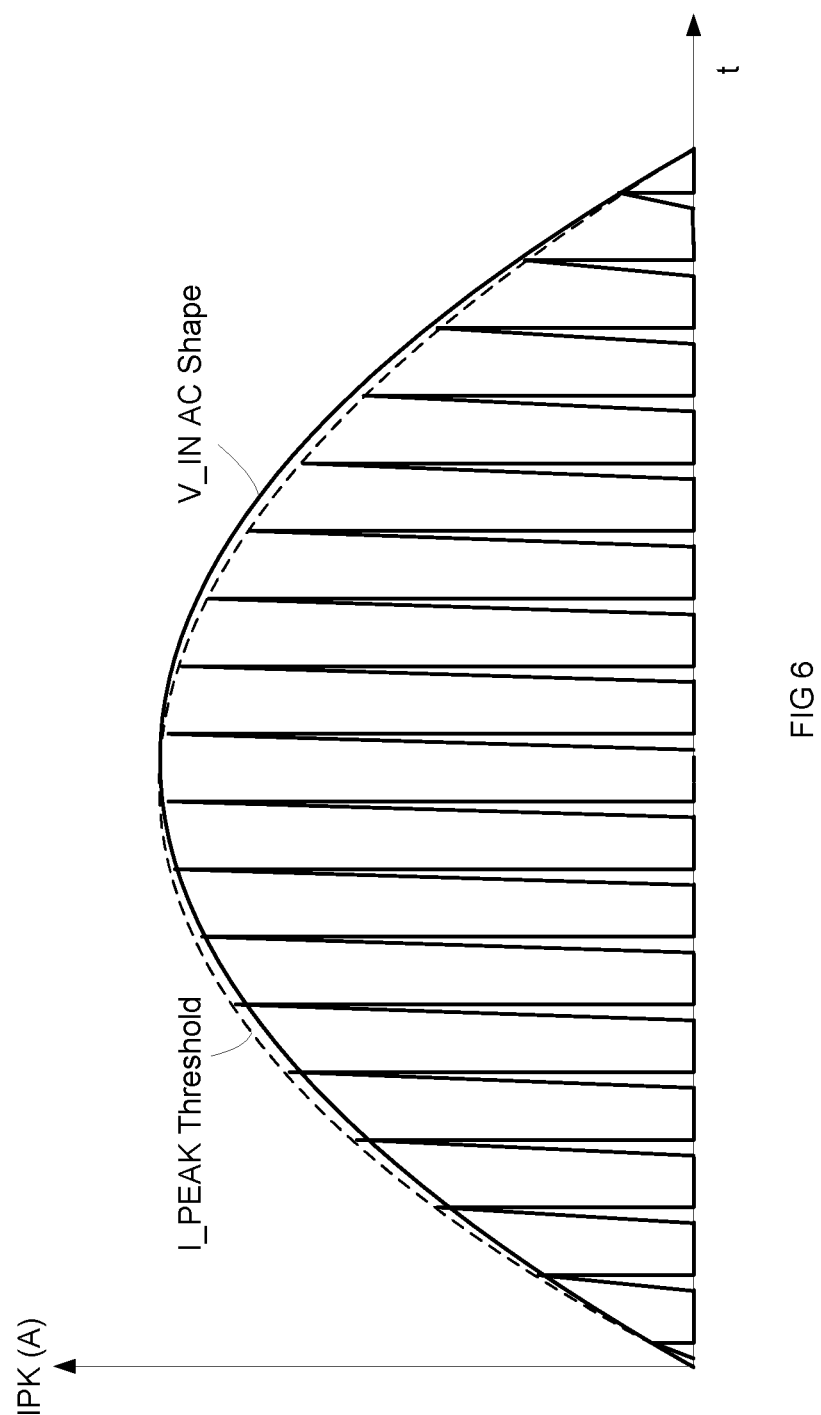

SWITCHING POWER CONVERTER WITH IMPROVED POWER FACTOR CORRECTION VIA FEEDBACK SIGNAL AVERAGING

TECHNICAL FIELD

This application relates to switching power converters, and more particularly to a switching power converter with improved total power factor correction through feedback signal averaging.

BACKGROUND

Single-stage AC-DC power conversion is a low cost and thus popular power supply topology for applications such as solid-state lighting. An important parameter for a single-stage AC-DC power switching converter is its power factor, which is the ratio of the real power delivered by the AC mains to the single-stage AC-DC switching power converter as compared to the apparent power delivered to the single-stage AC-DC switching power converter. The apparent power is insensitive to the phasing between the input current and voltage in contrast to the real power. The power factor (PF) is thus lowered if the input current and voltage are out of phase. The rectified input voltage to a single-stage AC-DC switching power converter cycles from approximately zero volts to the peak line voltage (e.g., 120 V*1.414 in the US) at twice the frequency for the AC mains. Given this sinusoidal pulsing or cycling of the rectified input voltage, the input current should have a similar profile to achieve a high PF such as by the use of a suitably-modified peak current or constant on time control methodology.

In either of these techniques, the switching power converter regulates the cycling of the power switch transistor so that the input current to the switching power converter during periods of high load has a profile that is in-phase with the profile or envelope for the rectified input voltage. Each cycle of the rectified input voltage begins with a relatively-low voltage (e.g. zero volts) to reach a peak voltage mid-cycle and then fall again to the relatively-low voltage. To achieve an high PF, the peak value for each cycle of the input current to the switching power converter will have a profile or threshold envelope that is similar to a rectified input voltage's envelope. The peak input current will thus cycle in phase with the rectified input voltage so that the peak input current will be relatively small at the beginning of a cycle, pass through a peak mid-cycle, and then fall again to a relatively-small value at the end of each cycle.

An example of the input voltage profile or envelope 110 across two cycles is shown in FIG. 1. In each cycle, the input voltage rises to a maximum value mid-cycle. A zero-crossing time 115 separates the two cycles. To achieve a high PF, the peak input current to the switching power converter should have a similar profile. The sinusoidal shaping of the peak input current profile causes the output voltage to have a low frequency ripple or oscillation as shown in FIG. 2 for the same two cycles of the rectified input voltage. The feedback loop in the switching power converter compares the output voltage to a reference voltage to generate a control voltage that will also have a corresponding low-frequency ripple or oscillation. The feedback loop responds to this low-frequency ripple in the control voltage signal such that the desired sinusoidal profile of the peak input current (I_PEAK Threshold) is distorted with regard to the rectified input voltage profile (V_IN) as shown in FIG. 3. The corresponding distortion of the peak input current profile lowers the PF.

Accordingly, there is a need in the art for single-stage power converters having robust power factor correction.

SUMMARY

To improve the power factor, a switching power converter is provided with a controller having feedback loop that averages a feedback signal with respect to cycles of a rectified input voltage. The averaging of the feedback signal occurs across a current cycle of the rectified input voltage to form an averaged feedback signal that is used by the feedback loop in a subsequent cycle of the rectified input voltage. Each cycle of the rectified input voltage corresponds to a half-cycle of an AC mains input voltage. A given cycle of the rectified input voltage extends from one zero-crossing time for the AC mains input voltage to a following zero-crossing time.

The feedback loop is part of a controller that modulates the cycling of a power switch transistor to regulate an output voltage. The feedback loop compares the output voltage to a reference voltage to generate an error signal that is compensated to form a control voltage. The controller modulates the cycling of the power switch transistor responsive to the control voltage. Given such a feedback loop structure, the averaged feedback signal may be one of the output voltage, the error signal, or the control voltage.

The controller modulates the cycling of the power switch using a known power factor correction technique such as the use of a constant on-time for the power switch transistor or so that the on-time of the power switch transistor is controlled to produce a peak input current that is proportional to the rectified input voltage. The resulting shaping of the input current envelope to be proportional to the envelope for the rectified input voltage introduces a low-frequency ripple or oscillation of the output voltage for the switching power converter. But the averaging of the feedback signal over each cycle of the rectified input voltage prevents the control signal (or the averaged control signal in embodiments in which it is the control signal that is the averaged feedback signal) from having a corresponding low-frequency ripple. The resulting power factor correction is thus improved because the low-frequency ripple would otherwise cause the controller to distort the envelope of the peak input current so as to be out-of-phase with the envelope for the rectified input voltage.

These advantageous features may be better appreciated through a consideration of the detailed description below.

BRIEF DESCRIPTION OF THE DRAWINGS

FIG. 1 illustrates the rectified input voltage sinusoidal envelope across two consecutive cycles of the rectified input voltage.

FIG. 2 illustrates the output voltage for a conventional single-stage switching power converter receiving the two consecutive cycle of the rectified input voltage of FIG. 1.

FIG. 3 illustrates the peak input current envelope for the conventional single-stage switching power converter of FIG. 2 and the corresponding envelope for one cycle of the rectified input voltage.

FIG. 6 illustrates an example peak input current envelope for a switching power converter with feedback signal averaging as compared to the envelope of a cycle of the rectified input voltage in accordance with an aspect of the disclosure.

Embodiments of the present disclosure and their advantages are best understood by referring to the detailed description that follows. It should be appreciated that like reference numerals are used to identify like elements illustrated in one or more of the figures.

DETAILED DESCRIPTION

To improve the single-stage power factor for a switching power converter, the feedback loop circuit is modified to respond to an average of the output voltage. In particular, the feedback loop circuit includes generates a control voltage that is responsive to an error between a filtered output voltage and a reference voltage (the desired value of the output voltage). To keep the control voltage from having a low-frequency ripple due to a corresponding low-frequency ripple in the output voltage, the filtered output voltage is an average of the output voltage over a cycle of the rectified input voltage. The averaging of the output voltage begins at the beginning of the cycle and ends with the end of the cycle. The integration or averaging of the output voltage is thus an "integrate-and-dump" operation across the cycle of the rectified input voltage. Alternatively, the control voltage itself may be averaged across the cycle of the rectified input voltage instead of averaging the output voltage. Regardless of whether it is the output voltage or the control voltage that is the feedback signal averaged over the cycle of the rectified input voltage, the resulting distortion between the envelope for the peak input current to the switching power converter and the envelope for the rectified input voltage is considerably diminished as compared to conventional feedback loops such that the power factor is improved accordingly.

Figure 4:
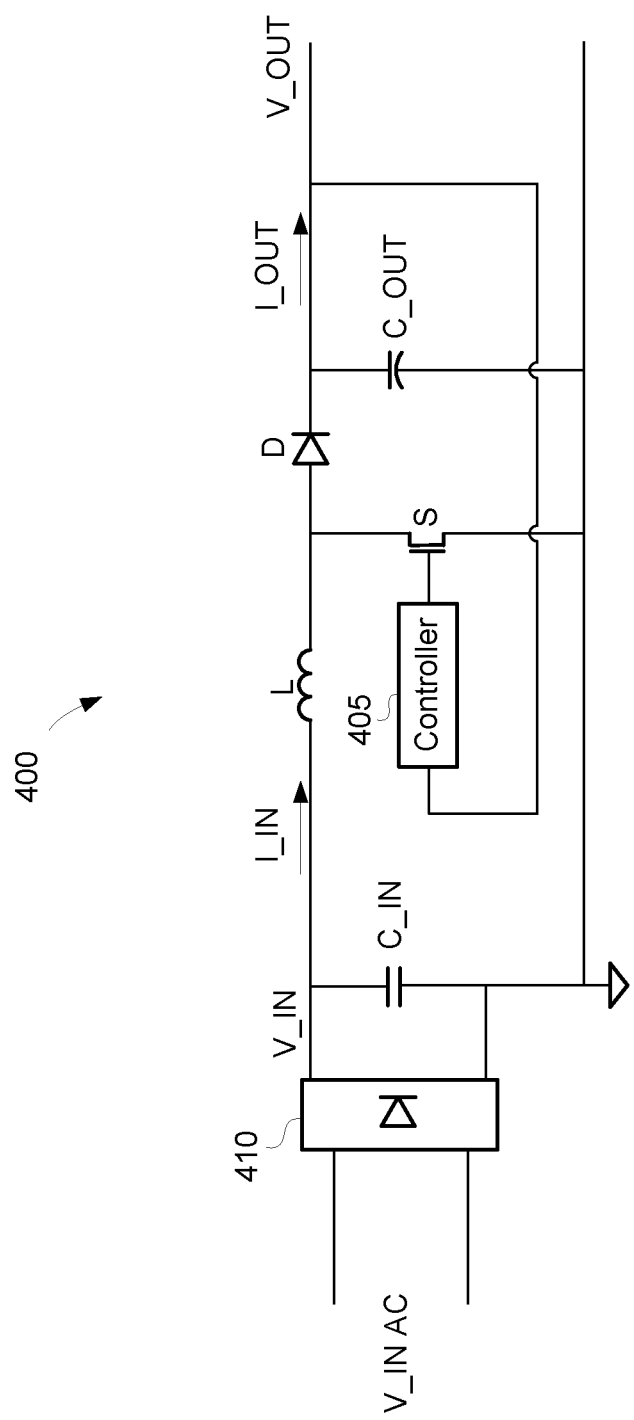
FIG. 4 illustrates an example boost converter configured to perform a feedback signal averaging in accordance with an aspect of the disclosure.

An example switching power converter is a boost converter 200 as shown in FIG. 4 but it will be appreciated that the feedback loop averaging herein is readily applicable to other types of switching power converters such as a buck converter or a flyback converter. A bridge rectifier 410 rectifies an AC mains input voltage (V_INAC) to form the rectified input voltage (Vin) on an input voltage rail. For each half-cycle of the AC mains input voltage, the rectified input voltage will have a cycle as discussed for FIG. 1. An input capacitor Cin coupled between the input voltage rail and ground stores and filters the rectified input voltage. A controller 305 regulates an output voltage (V_OUT) by modulating the cycling of a power switch transistor S. A terminal (e.g., a source terminal) of the power switch transistor is tied to ground whereas a remaining terminal (e.g., a drain terminal) couples to the input voltage rail through an inductor L. While the power switch transistor is cycled on, an input current (Iin) flows through the inductor and through the power switch transistor into ground. During this switch on-time, an output diode D1 is reversed biased to prevent an output current (Iout) from flowing out of the boost converter to charge an output capacitor Cout with the output voltage. When the power switch transistor is cycled off, the output diode becomes forward biased so that the inductor freewheels to drive the output current and charge the output voltage. In alternative embodiments, the output diode may be replaced with a synchronous rectifier switch transistor.

To achieve a high PF, controller 300 may cycle the power switch transistor so as to have a constant on-time in each power switch transistor cycle. The switching period for the cycling of the power switch transistor is relatively small compared to the rectified input voltage cycle period so that the power switch transistor is cycled multiple times across the rectified input voltage cycle. Since there is a constant on-time in each power switch transistor cycle, an envelope for the peak input current will be proportional to the rectified input voltage envelope. Alternatively, controller 300 may determine a peak input current for each cycle of the power switch transistor that is proportional to the rectified input voltage. After determining a desired peak input current for a given cycle of the power switch transistor, controller 300 would then cycle on the power switch transistor until the desired peak input current is reached. Although both a constant on-time or a peak input current approach are conventional for power factor correction, both techniques will suffer from the distortion shown in FIG. 3 if a conventional feedback loop is utilized.

Figure 5:
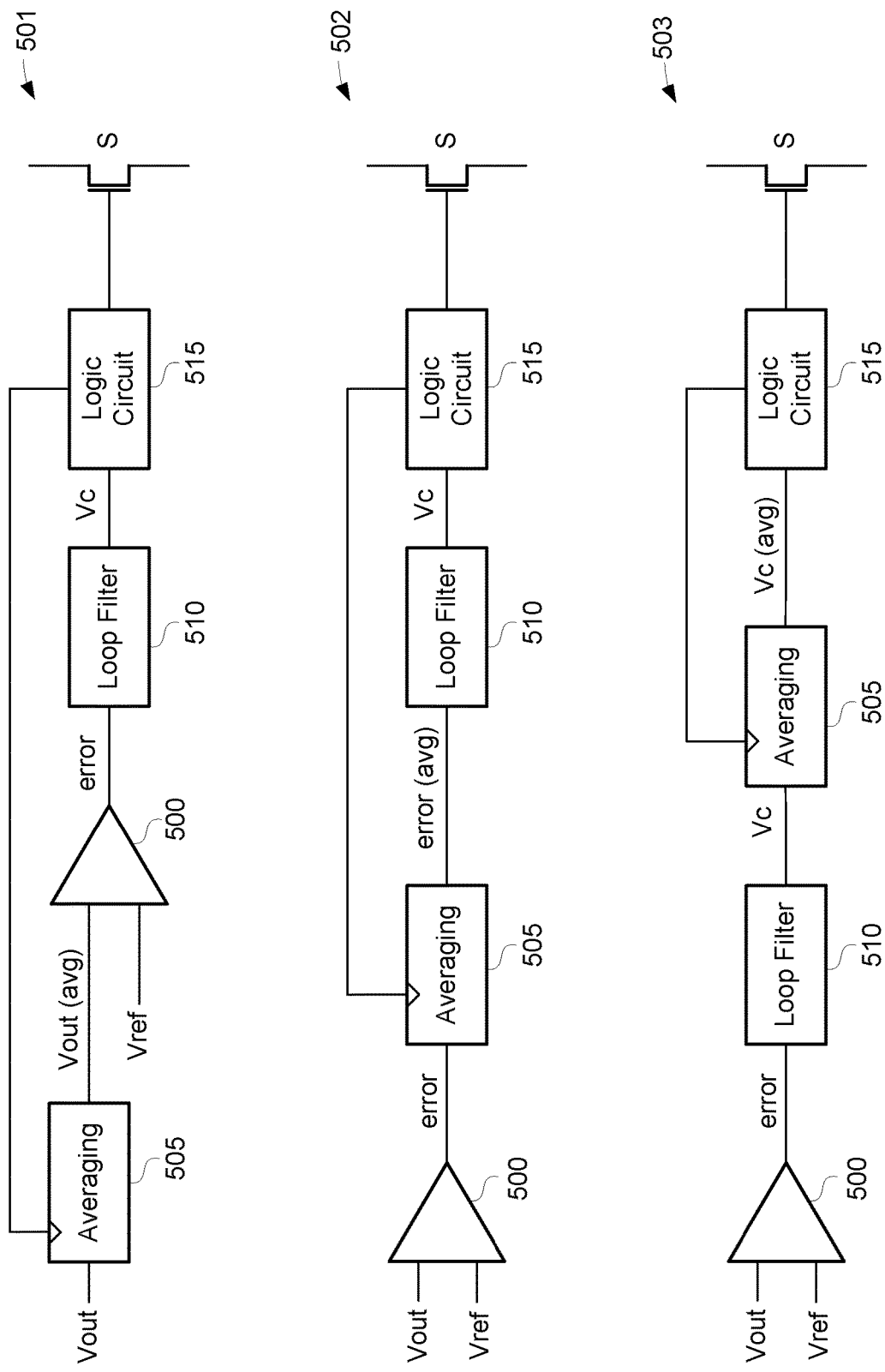
FIG. 5 illustrates three example embodiments for a switching power converter controller including a feedback loop with feedback signal averaging in accordance with an aspect of the disclosure.

To improve the power factor correction, the feedback loop is modified to average a feedback signal within controller 300 as shown in FIG. 5. There are three configurations or embodiments shown in FIG. 5. In a first embodiment 501, an averaging circuit 505 averages the output voltage over a cycle of the rectified input voltage to produce an averaged output voltage (Vout(avg)). An error signal generator 500 generates an error signal based upon a difference or error between the averaged output voltage and a reference voltage to produce an error signal that is compensated by a loop filter 510 to form a control voltage Vc. A logic circuit 515 regulates the cycling of power switch transistor S responsive to the control voltage Vc.

Rather than averaging the output voltage, the averaging circuit may instead average the error signal as shown in embodiment 502 to form an averaged error signal (error (avg)). In such an embodiment, the averaging circuit intervenes between error signal generator and the loop filter so that the loop filter compensates the averaged error signal to form the control voltage Vc. In yet another alternative embodiment 503, the averaging circuit instead averages the control signal Vc from the loop filter to form an averaged control signal (Vc(avg)). In embodiment 503, the logic circuit regulates the cycling of power switch transistor S responsive to the averaged control signal.

Regardless of which feedback signal is being averaged, the averaging circuit begins its averaging at the beginning of a current cycle of the rectified input voltage and finishes the averaging at the end of the current cycle. The integration or averaging is thus on a cycle-by-cycle basis with respect to the rectified input voltage. Referring again to FIG. 1, there is a zero-crossing time 115 for the AC mains input voltage that separates consecutive cycles of the rectified input voltage. For example, consider the first cycle of the rectified input voltage shown in FIG. 1. The integration of the feedback signal would begin at the beginning of this first cycle and end at zero-crossing time 115 that marks the end of the first cycle. The averaging by the averaging circuit thus extends across each half cycle of the AC mains input voltage. The summed or integrated feedback signal is then averaged and used as the feedback signal in the subsequent cycle of the rectified input voltage.

The logic circuit detects the zero-crossing times so that the averaging circuit may be timed accordingly to begin and end its averaging. Such detection of the zero-crossing times may be performed in a number of ways as known in the switching power converter arts. For example, a sense resistor (not illustrated) may be inserted in the ground return path to the bridge rectifier. The logic circuit may then monitor the voltage across such a sense resistor to sense the zero-crossing times. Alternatively, the logic circuit may use the voltage across a sense resistor (not illustrated) in series with the power switch transistor to detect the zero-crossing times.

The feedback loop in these various embodiments is formed by the error signal generator 500 and the loop filter 510. In an analog embodiment for the feedback loop, error signal generator 505 is an error amplifier. In a digital embodiment, the output voltage (or the averaged output voltage depending upon which feedback signal is being averaged) and the reference voltage are both digital signals so that error signal generator 505 would be comprise an adder that subtracts the digitized reference voltage from the digitized output voltage to form a digital error signal. Loop filter 510 would be an analog filter in an analog embodiment and a digital filter in a digital embodiment.

Logic circuit 515 modulates the cycling of the power switch transistor S1 using either a constant on-time for each cycle of the power switch or so that a peak current for each cycle of the power switch is proportional to the rectified input voltage. Such power factor correction techniques are known in the art and thus will not be discussed further in detail herein. But the integration of these known power factor correction techniques with an averaged feedback signal such as shown in embodiments 501, 502, and 503 result in a substantial improvement in power factor correction. For example, an example peak input current envelope (I_PEAK Threshold) is shown in FIG. 6 for a switching power converter with an averaged feedback loop signal as disclosed herein. The phasing between the peak input current envelope across a half-cycle of the envelope for the AC mains input voltage (V_IN AC Shape) is considerably improved as compared to the conventional distortion discussed with regard to FIG. 3.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter controller, comprising:
an averaging circuit configured to average a feedback signal from a beginning of a first cycle of a rectified input voltage to an end of the first cycle to generate an averaged feedback signal;
a feedback loop circuit configured to generate a control signal responsive to the averaged feedback signal; and
a logic circuit configured to modulate a cycling of a power switch transistor responsive to the control signal during a second cycle of the rectified input voltage so that each cycle of the power switch transistor has a constant on-time.

2. The switching power converter controller of claim 1, wherein the averaging circuit is configured to average an output voltage to form an averaged output voltage as the averaged feedback signal, and wherein the feedback loop circuit comprises:
an error signal generator configured to generate an error signal responsive to an error between the averaged output voltage and a reference output voltage, and
a loop filter configured to compensate the error signal to form the control signal.

3. The switching power converter controller of claim 2, wherein the error signal generator is an analog error amplifier.

4. The switching power converter controller of claim 2, wherein the error signal generator is a digital adder.

5. The switching power converter controller of claim 2, wherein the switching power converter controller is a controller for a boost converter.

6. The switching power converter controller of claim 1, wherein the feedback loop circuit comprises:
an error signal generator configured to generate an error signal responsive to an error between an output voltage and a reference output voltage, wherein the averaging circuit is configured to average the error signal to form an averaged error signal as the averaged feedback signal; and
a loop filter configured to compensate the averaged error signal to form the control signal.

7. The switching power converter controller of claim 6, wherein the error signal generator is an analog error amplifier.

8. The switching power converter controller of claim 6, wherein the error signal generator is a digital adder.

9. The switching power converter controller of claim 1, wherein the logic circuit is further configured to trigger the averaging circuit to begin averaging at a beginning of the first cycle and to stop averaging at an end of the first cycle.

10. A switching power converter controller, comprising:
a feedback loop circuit configured to generate a control signal responsive to an error between an output voltage and a reference voltage;
an averaging circuit configured to average the control signal from a beginning of a first cycle of a rectified input voltage to an end of the first cycle to generate an averaged control signal; and
a logic circuit configured to modulate a cycling of a power switch transistor responsive to the control signal during a second cycle of the rectified input voltage so that each cycle of the power switch transistor conducts a peak input current that is proportional to the rectified input voltage.

11. The switching power converter controller of claim 10, wherein the feedback loop circuit comprises:
an error signal generator configured to generate an error signal responsive to an error between the output voltage and the reference output voltage, and
a loop filter configured to compensate the error signal to form the control signal.

12. The switching power converter controller of claim 11, wherein the error signal generator is an analog error amplifier.

13. The switching power converter controller of claim 11, wherein the error signal generator is a digital adder.

14. The switching power converter controller of claim 11, wherein the switching power converter controller is a controller for a boost converter.

15. A switching power converter controller, comprising:
- a feedback loop circuit configured to generate a control signal responsive to an error between an output voltage and a reference voltage;
- an averaging circuit configured to average the control from a beginning of a first cycle of a rectified input voltage to an end of the first cycle to generate an averaged control signal; and
- a logic circuit configured to modulate a cycling of a power switch transistor responsive to the control signal during a second cycle of the rectified input voltage so that each cycle of the power switch transistor has a constant on-time.

16. The switching power converter controller of claim 15, wherein the feedback loop circuit comprises:
- an error signal generator configured to generate an error signal responsive to an error between the output voltage and the reference output voltage, and
- a loop filter configured to compensate the error signal to form the control signal.

17. The switching power converter controller of claim 16, wherein the error signal generator is an analog error amplifier.

18. The switching power converter controller of claim 16, wherein the error signal generator is a digital adder.

19. The switching power converter controller of claim 15, wherein the logic circuit is further configured to trigger the averaging circuit to begin averaging at a beginning of the first cycle and to stop averaging at an end of the first cycle.

20. The switching power converter controller of claim 15, wherein the switching power converter controller is a controller for a boost converter.

* * * * *